United States Patent [19]

Brandt et al.

[11] 3,936,047

[45] Feb. 3, 1976

[54] BODY PHYSICAL CONDITIONING MACHINE

[76] Inventors: William E. Brandt, 12567 Saratoga Creek, Saratoga, Calif. 95070; Allen L. Clark, 1654 Sundown Lane, San Jose, Calif. 95127

[22] Filed: Mar. 10, 1971

[21] Appl. No.: 122,754

Related U.S. Application Data

[62] Division of Ser. No. 818,173, March 24, 1969, now Pat. No. 3,581,739

[52] U.S. Cl. .................. 272/57 A; 35/12 P; 73/379

[51] Int. Cl.² ...................... A63B 21/22; G09B 9/08

[58] Field of Search ........... 35/12 P, 12 C; 272/1 R, 272/1 C, 28 R, 28 S, 33 R, 33 A, 36–39, 49, 50, 57 R, 57 A, 57 B, 58, 60, 42, 51

[56] References Cited

UNITED STATES PATENTS

| | | | |
|---|---|---|---|
| 1,342,871 | 6/1920 | Ruggles | 35/12 P UX |
| 1,393,456 | 10/1921 | Ruggles | 35/12 P |
| 1,896,175 | 2/1933 | Huffman | 272/1 C |
| 2,228,793 | 1/1941 | Swofford | 272/58 |
| 2,528,516 | 11/1950 | Herrmann | 272/36 |
| 2,854,064 | 9/1958 | Judd et al. | 272/51 |
| 2,855,199 | 10/1958 | Noland et al. | 272/58 |
| 2,944,592 | 7/1960 | Halter | 272/58 UX |
| 3,141,669 | 7/1964 | Chul | 272/33 R |
| 3,164,382 | 1/1965 | Johnson | 272/33 R |
| 3,276,777 | 10/1966 | Pruitt | 272/33 R |
| 3,519,268 | 7/1970 | McQueen | 272/58 UX |

FOREIGN PATENTS OR APPLICATIONS

| | | | |
|---|---|---|---|
| 577,226 | 5/1924 | France | 272/57 A |
| 1,348,337 | 11/1963 | France | 272/51 |
| 516,580 | 1/1940 | United Kingdom | 272/1 C |

*Primary Examiner*—Richard J. Apley
*Attorney, Agent, or Firm*—Alfons Puishes

[57] ABSTRACT

A machine is equipped with a rotating support platform, which may have two distinct degrees of freedom or motion in the plane of said platform, which latter may be tilted at an angle to the horizontal. The body of a person mounting and bracing himself, or being placed on such platform is subject to downward as well as lateral gravitational forces as the platform rotates and/or translates. Muscular resistance to this pull produces an unusually effective and relatively effortless exercise and therapeutic effect. Angle of tilt and speed of rotation may be varied to suit the individual. When the body support function is combined with a two directional effect, the user can receive a direct indication of the sufficiency with which he is performing the exercising routine by means of suitably located indicating instruments.

6 Claims, 8 Drawing Figures

INVENTORS
William E. Brandt
Allen L. Clark
BY
Alfons Puschs
Attorney

INVENTORS
William E. Brandt
Allen L. Clark
BY
Attorney

INVENTORS
William E. Brandt
BY Allen L. Clark
Attorney

INVENTORS
William E. Brandt
BY Allen L. Clark
Alfons Puishes
Attorney

INVENTORS
William E. Brandt
BY Allen L. Clark
Attorney

BODY PHYSICAL CONDITIONING MACHINE

This application is a division of our copending application, Ser. No. 818,173 filed Mar. 24, 1969, and now U.S. Pat. No. 3,581,739.

BACKGROUND OF THE INVENTION

It is well known that the basic muscles of the human body which support the latter in the earth's gravitational field may be infrequently used in the normal course of our modern lives. These muscles known as "skeletal" muscles are about 600 in number in the human body and their proper exercising has been the subject of some research.

In a paper entitled "The Effects of Isometric and Isotonic Exercise on the Skeletal Muscles" by M. Maxim Asa published at Springfield College, Springfield, Mass. in 1959, a series of muscle tone experiments were reported. Two types of exercises were performed on over 200 subjects and described as "isometric" (exercises performed by contracting the muscle without moving the joint to which it is attached) and "isotonic" (exercises in which a part is moved by muscle contraction) respectively. The author found that a 6 second isometric contraction followed by a 20 second relaxation repeated a few times per day, was the optimum method of strengthening the skeletal muscles.

It is also well known that strengthening the skeletal muscles reduces the surplus tissue or fat, especially around the waist and abdomen. Many previous devices built for purposes of weight reduction and muscle building have generally been self-propelled and, at best, supply uncontrolled exercise providing random physical exertion on the part of the user. The class of powered vibration machines, in general, provide a rather haphazard physical conditioning action. All existing devices have ignored the scientific approach of M. Maxim Asa indicated above.

SUMMARY

It is therefore a general object of our invention to provide a more efficient machine for body physical conditioning based upon the cylic contraction and relaxation principle outlined above.

It is a more specific object of our invention to provide a machine which would utilize the resistance of the human body to gravitational forces or components thereof in a novel manner to effect body physical conditioning.

It is another general object of our invention to provide a form of full body exercise which utilizes the reaction of the body against a spring force which can be used to effect weight reduction and muscle building in a zero-gravity or weightless environment in a manner which is essentially equivalent to the effects produced due to the body reacting to the gravitational component of weight on earth.

It is another general object of our invention to provide a method of weight reduction and muscle building which comprises rotating the human body about its vertical center line at an angle to the vertical so that the force of gravity is exerted in varying degrees on all the muscles in the body.

It is still another object of our invention to provide a body support platform which can translate with several degrees or directions of freedom with visual position indication so that the proper body muscle groups must be reacted to maintain the platform position and derive the maximum benefits from our invention.

It is yet another object of our invention to provide a body support platform which is snubbed or restrained by springs and can translate with visual position indication in several directions requiring the full body reaction of various muscle groups to maintain a given lateral platform deflection which does not necessarily require the pull of gravity.

It is an important object of our invention to provide a machine and method for physical conditioning of the human body of paraplegics and others not able to exercise by normal means.

We have discovered that by providing a machine whereby we utilize either the forces of gravity and/or suitable spring forces in a prescribed and regulated manner alone or in combination with lateral reaction forces to produce alternate muscular tension and relaxation in any desired part of the body, we are able to accomplish all of the objects enumerated above. Specifically, our machine is constructed to provide a rotating platform upon which the person stands, or is placed. Further provision is made for tilting the platform at an angle which may be variable or set to a predetermined value. The platform is then caused to rotate, thereby subjecting the body to cyclical action of the force of gravity. The person holds and braces himself, or is braced on the platform in the manner disclosed in more detail hereinbelow. The body of the person thus automatically resists the forces of gravity to a set degree and frequency according to a predetermined cycle. All parts of the body are thus given the benefit of the exercise and particularly the skeletal muscles in the isometric manner mentioned above and described in more detail below. We may provide also a translating platform with complete visual position indicator which may be used alone or in combination with the above to achieve beneficial results. Furthermore, the above platform may be used in conjunction with spring forces to effect the above described results in a zero-gravity environment.

DESCRIPTION OF VARIOUS PREFERRED EMBODIMENTS

Figure 1:
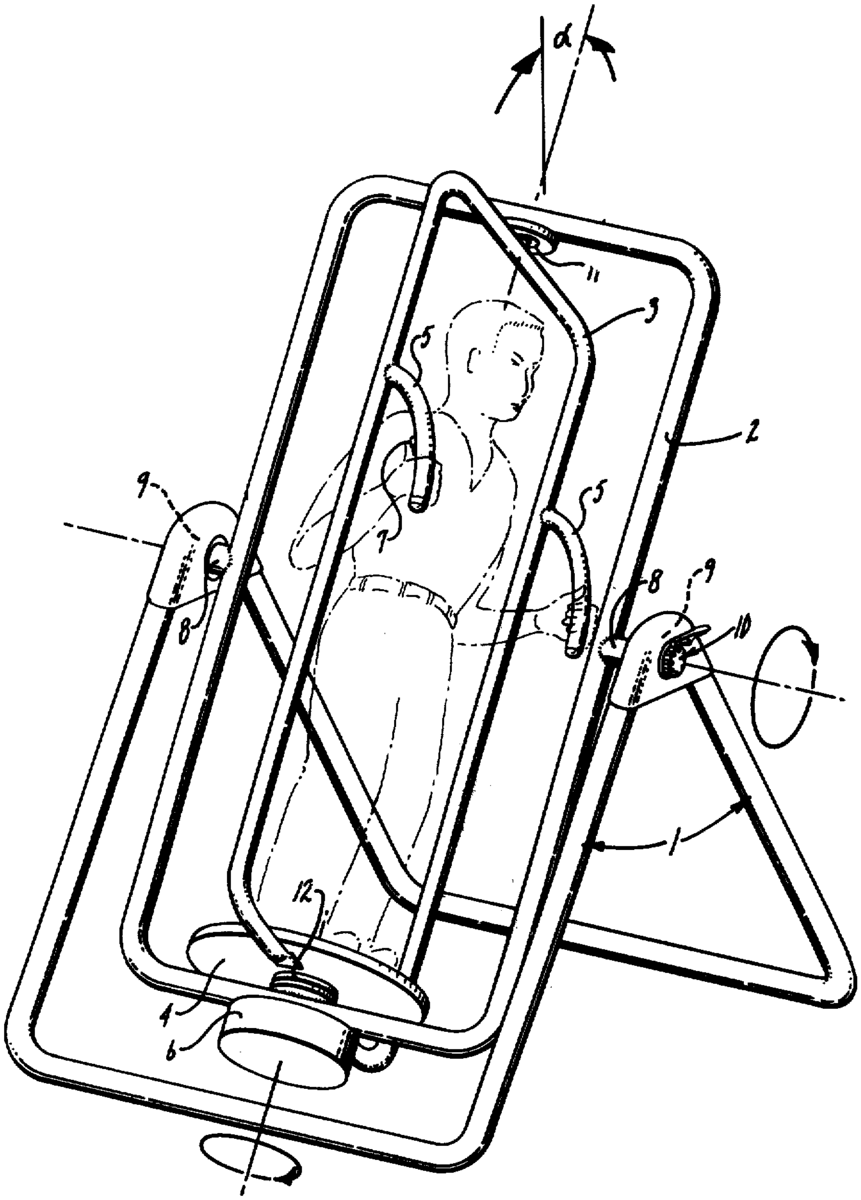
FIG. 1 is an isometric view of one embodiment of a machine utilizing the tilting and rotating platform of our invention.

Referring now to the drawings and particularly to FIG. 1, there is seen first an A frame 1 which may be fabricated from pipe or other structural material. A hollow, tilting frame 2, which may be of generally rectangular construction, is pivotally mounted on frame 1 and arranged for tilting about a horizontal axis as described more fully below.

A rotating hollow frame 3 is mounted within frame 2 and arranged for rotation about a vertical axis.

A rotating platform 4 is mounted on the bottom of frame 3 which is equipped also with handles 5. Rotation of platform 4 and frame 3 is effected by geared head motor 6 which may be of any conventional type to effect rotation. We have found that the optimum speed in most instances lies between 3 to 10 RPM, although we do not limit ourselves to those values. Control of the speed of motor 6 is effected by means of a thumb control switch 7 positioned on one of the handles 5 and wired to the motor and power source in a conventional manner not shown.

The horizontal stub shafts or trunnions 8 positioned on a horizontal axis of frame 2 ride in bearings 9 which in turn are positioned on frame 1. Frame 2 may thus be tilted at any desired angle $\alpha$ to the vertical. The angle may be varied by means of a ratchet and pawl arrangement 10 to any desired value as described more fully below.

Frame 3 is properly journaled and rides in top vertical bearing 11 and bottom vertical thrust bearing 12, both of which may be of the anti-friction type.

For tilting frame 2 we may employ an electrical linear actuator and bell-crank arrangement (not shown) or we may employ a geared head tilting motor (not shown) mounted on frame 1 and coupled to trunnion 8 preferably outside of ratchet and pawl arrangement 10. In this variation, thumb switch 7 is provided with additional contacts wired to the power source and tilting motor. This permits the operator to vary the angle $\alpha$ automatically while standing on platform 4. In this manner the intensity of the exercising may be varied in small increments while it is in progress and to the precise extent desired by the person.

Figure 2:
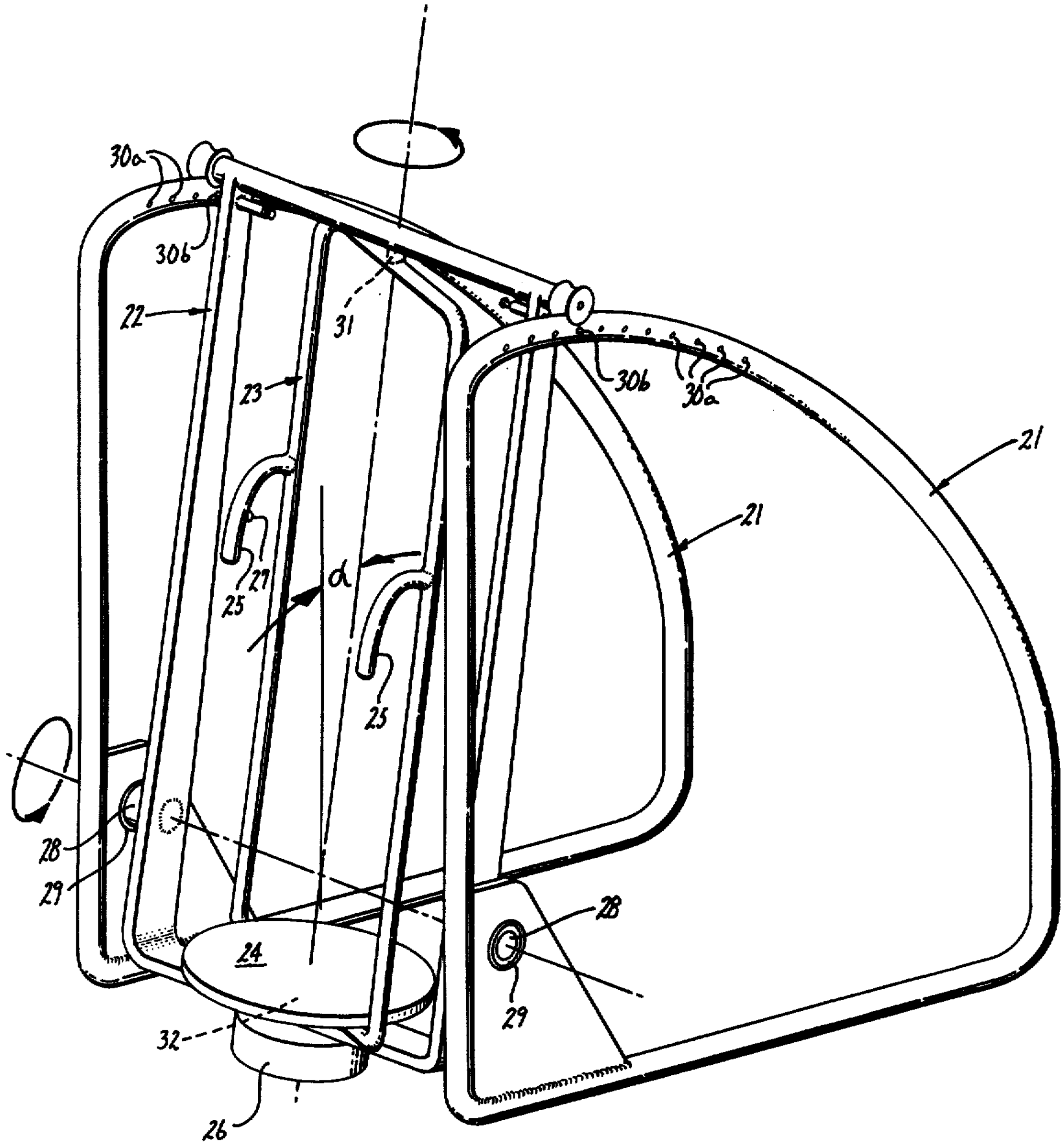
FIG. 2 is an isometric view of another embodiment of a machine utilizing the tilting and rotating platform of our invention.

In the embodiment of FIG. 2, we utilize stationary side frame supports 21 which may also be of pipe or other structural construction. Mounted on support frames 21 is hollow tilting frame 22 and within this is hollow rotating frame 23.

Rotating platform 24 is mounted on the bottom side of rotating frame 23 and is equipped with handles 25. Rotation of platform 24 and frame 23 is effected by geared head motor 26. Thumb control switch 27 positioned on one of the handles 24 controls the speed of motor 26 through interconnection to a power source not shown.

Trunnions 28 ride in horizontal bearings 29 positioned on side frames 21.

Top and bottom vertical bearings 31 and 32 respectively provide for rotation of frame 23 inside frame 22.

Up to this point the embodiment of FIG. 2 is very similar to that of FIG. 1.

For tilting of frame 22 of FIG. 2 and holding platform 24 at a predetermined angle we provide a series of holes 30a through the top portion of side frames 21 spaced at regular intervals. Pins **30*b* which may be spring loaded are positioned on frame 22 and disposed to engage holes 30*a* thereby holding frame 22 and platform 24** at the aforesaid predetermined angle.

Figure 3:
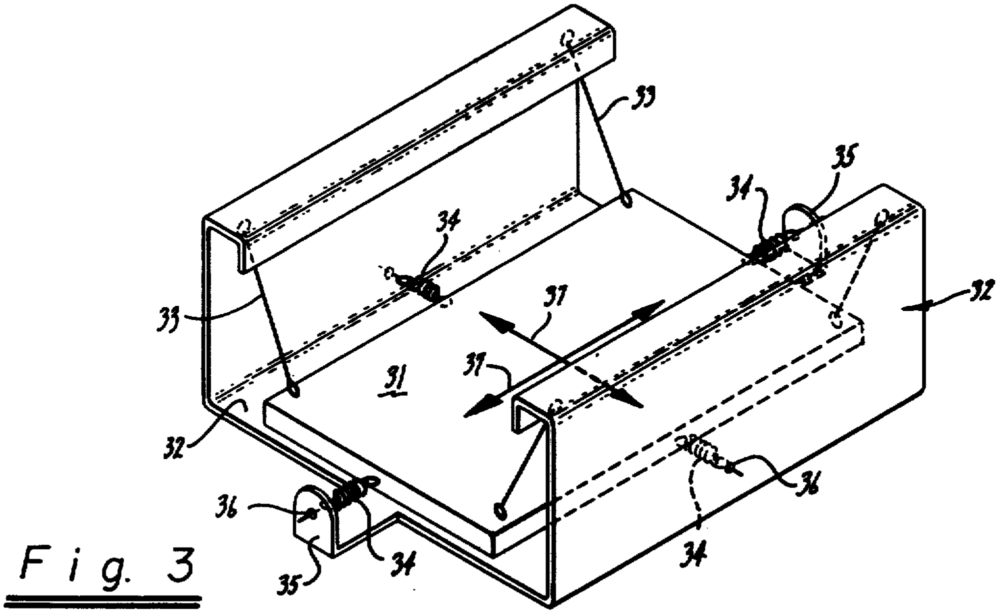
FIG. 3 is an isometric view of a two directional exercise platform representing another embodiment of our invention.

We have discovered also that excellent results may be obtained by a number of variations and different embodiments of our basic invention described above. Referring now to FIG. 3, there is seen body support platform 31 which is suspended from U-frame support 32 by means of suspension members 33. Snubber springs 34 for resisting the motion of platform 31 are optional. When used, these are held in place by spring support 35 and the tension may be adjusted by means of adjusting screws 36. Only one of the latter combinations is shown in full, but it is evident that four of these may be used on all four sides of platform 31 if desired. The arrows 37 indicate the directions in which the platform may be made to move during the operation of our machine.

Figure 4:
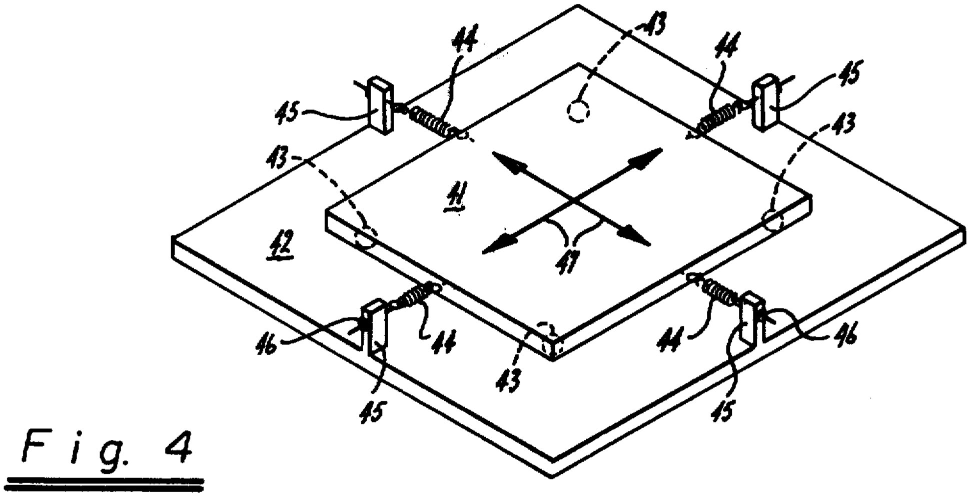
FIG. 4 is another embodiment of a two directional exercise platform of our invention.

Referring now to FIG. 4, there is seen an alternate embodiment of a two directional platform. This comprises body support platform 41 and base support 42. These are separated by ball bearing members 43 which may rest in suitable sockets on the under surface of support platform 41 and ride on the upper surface of support 42. Snubber springs 44, having spring support members 45 and adjusting screws 46, may likewise be utilized in a manner similar to that disclosed in FIG. 3. The arrows 47 here also indicate the direction of motion of support platform 41 when in operation.

Figure 5A:
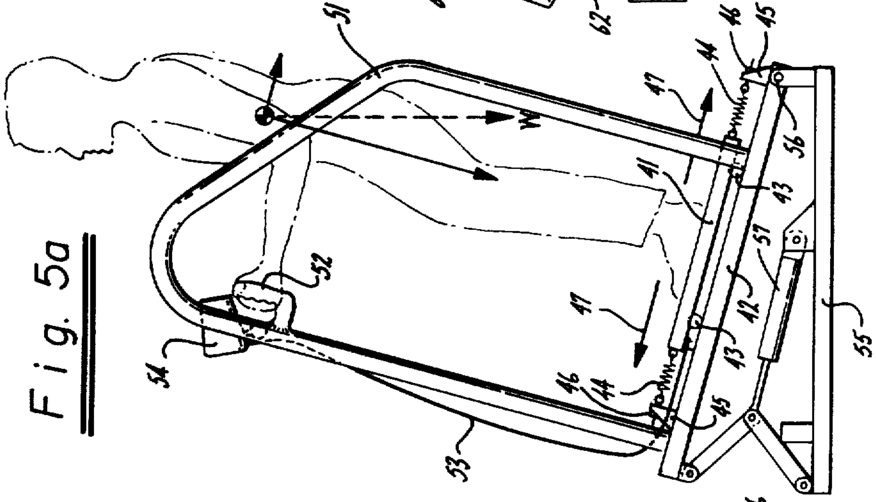
FIG. 5*a* is an elevation showing an adaptation of a two directional exercise platform to an inclined exercising machine.
Figure 5:
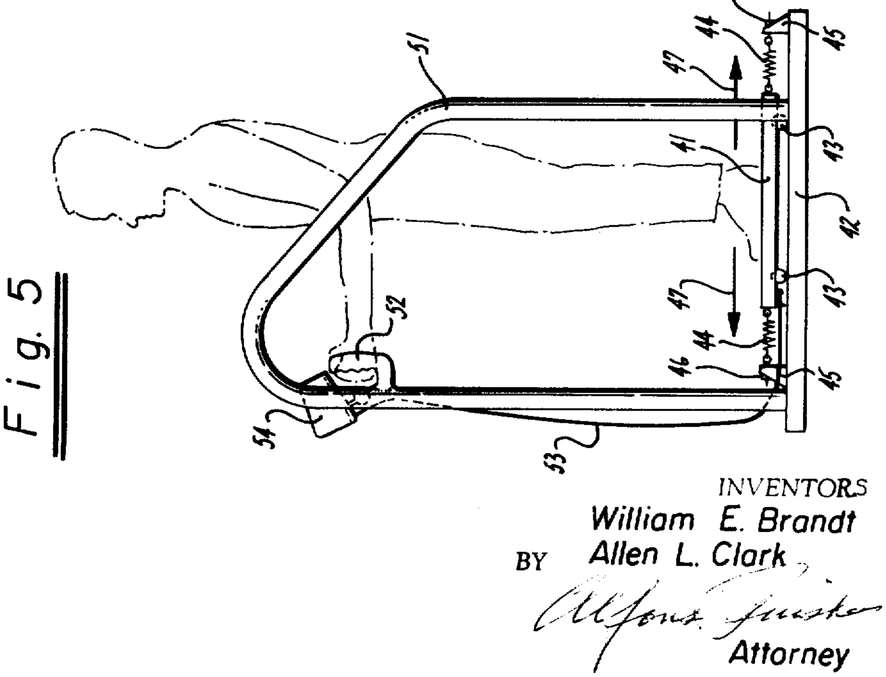
FIG. 5 is an elevation showing an adaptation of a two directional exercise platform to a horizontal spring reaction force exercising machine.

In FIG. 5 there is seen a combination of either of the platform embodiments of FIG. 3 or FIG. 4 in combination with a horizontal exercising machine, which provides a suitable lateral force 47 proportional to the deflection of spring 44. In the illustration shown the embodiment of FIG. 4 is utilized, like numbers indicating like elements of the embodiment. In addition to this, the machine comprises side frames 51, handle for grasping 52, cable shield for the indicating device 53, and the indicator itself 54. The latter element is disclosed in detail in FIG. 7 and will be described more fully below.

In FIG. **5*a* there is shown one of our body support platforms in combination with an inclined machine, which provides a reactive force 47 proportional to the lateral component of body weight W and/or to the deflection of spring 44. Here the like numbers represent the corresponding parts of FIG. 5 and FIG. 4. In addition there is shown a base support 55 and a hinge member 56 joining base support 42 with support member 55. A jack 57** interposed at the opposite end of these two members makes it possible to change the angle $\alpha$ between these two members and thus get a variation in the gravitational forces on the person using the machine. The latter is illustrated by arrow W and shows two components acting on the body of the person exercising. Since the machine in this embodiment is non-rotational, the cyclic contraction-relaxation period is supplied by the user aided by a clock timer or other suitable instrument.

Figure 6:
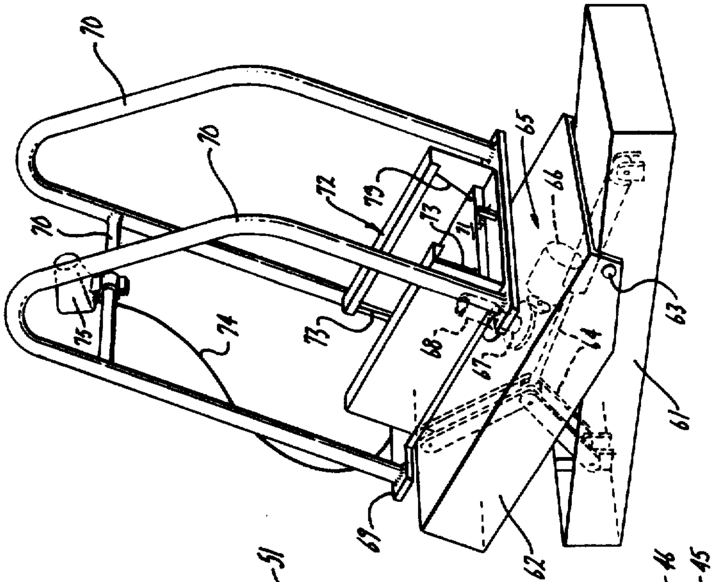
FIG. 6 is an isometric view showing a machine utilizing a combination of a tilting and rotating platform with a two directional platform.

In FIG. 6 there is seen another embodiment of our invention. In this embodiment horizontal base 61 supports tilting base 62 through hinge or pivot member 63. Tilting jack 64 permits variation of the angle between these two members as previously described. Tilting base 62 contains a housing 65 in which is positioned rotating drive 66 and electrical controls. (The latter is not shown in detail.) Drive shaft 67 connects the driving motor 65 which may also be equipped with a reduction gear, not shown, to rotating coupling 68. The latter is secured to rotating platform 69 in any desired manner. Rotating frames and hand holes 70 are positioned on this platform also in a manner similar to that disclosed for previous embodiments (FIG. 1 and FIG. 2.)

In this particular disclosure we show our exercising machine in combination with the two directional platform of FIG. 3, although it is evident that the embodiment of FIG. 4 may also be used. In the disclosure shown there is body support platform 71 which is suspended from U-frame support 72 by means of suspension member 73. The snubber springs are not shown on this Figure, but it is evident that they may be used here also if desired. Position indicator transmission cable shield 74 connects from platform 71 to the indicator itself 75, as more fully described below.

Figure 7:
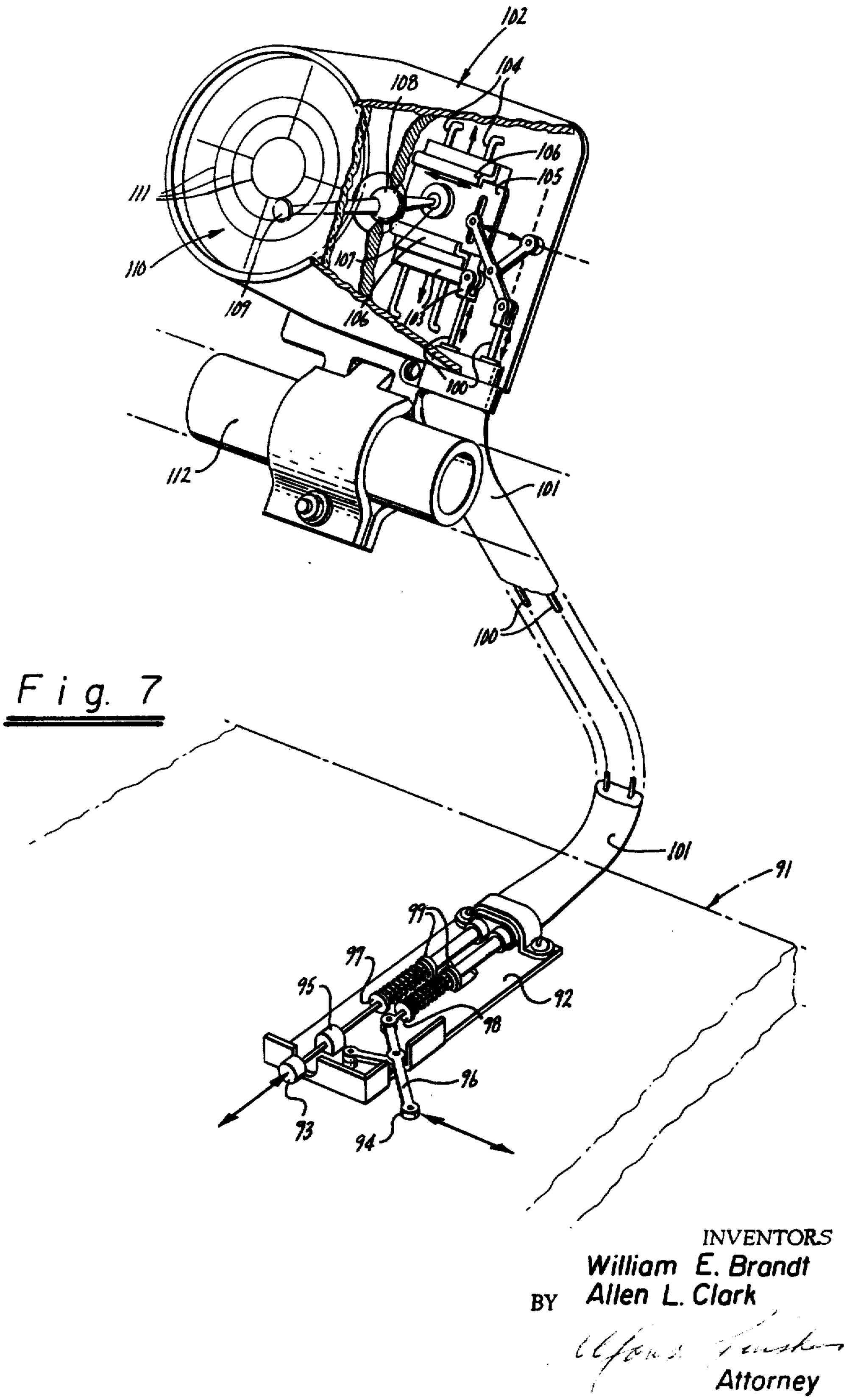
FIG. 7 is a diagrammatic representation partly in section showing the construction and operation of a telemeter system and position indicator which may be used in the control of the operation of our invention.

FIG. 7 shows a preferred embodiment of our telemetering system and position indicator shown only schematically on FIG. 5*a* and FIG. 6. Inside of support platform 91 which may correspond to platform 31 of FIG. 3, 41 of FIG. 4, or 71 of FIG. 6 is located actuator support plate 92. Backward and forward actuator member is shown at 93 and sidewise acutator member at 94. These, of course, are fastened to the corresponding front and side edges of the support platform in any desired manner. Bearing 95 serves to support the backward and forward actuator while a four-bar linkage mechanism 96 serves the sidewise motion actuator. These in turn are acted upon by spring loaded plungers 97 and 98, supported by bearings 99 to permit transmission of the respective motions to transmission wires 100 in a manner well known to those skilled in the art for instrumentation of this type.

Transmission wires 100 are positioned inside of cable sheath 101 which may be of any type of flexible metallic or similar construction, also known to those skilled in the art.

Indicator housing 102 is fixedly positioned on hand grip support 112. In the embodiment shown on this Figure it may be supported on the corresponding structural element of any one of the other embodiments previously disclosed. It is preferred, of course, that the indicator face or dial 110 be visible to the person using the machine although when used for special therapy it may face the physician or physical therapist.

Inside the housing 102 is positioned vertical slide 103 which moves in a vertical direction on slide guides 104. Horizontal slide guide 105 in turn moves on horizontal slide guides 106. The transmission wires 100 connect from the backward and forward motion actuators and the sidewise motion actuators respectively to the vertical slide 103 and horizontal slide 105. In this case of the latter, we again utilize a four-bar linkage machanism 105*a* in order to convert the motion of the transmisison wire 100 for the background and forward motion from a vertical to a horizontal direction. It will be readily seen from the Figure that vertical slide 103 is positioned upon horizontal slide 105 so that its motion represents a composite or an integration of the motion of both slides in either direction. A ball and socket joint 107 is consequently positioned on top of the horizontal slide 105 and connects through pivot or support point 108 to pointer 109. Pointer 109 may be observed through a transparent indicator face 110 positioned on housing 102. The face 110 may serve also as a dial upon which there may be inscribed suitable graduations 111. In the embodiment shown there are seen a series of concentric circles divided into quadrants which correspond to four positional zones of the platform. These may be designed by letters or numerals such as I, II, III, and IV denoting quadrants starting at the upper right facing the dial and moving in a clockwise direction through 360°. Thus I would represent a positional zone of the platform forward and to the right hand, II rearward and to the right hand, III rearward and to the left hand, and IV forward and to the left hand. The intensity of the exercising effect would be indicated by the concentric circles of increasing diameter on the face of the dial.

OPERATION OF ABOVE EMBODIMENTS

The operation herein described is directed to FIG. 1, although it will be evident that it applies also to FIGS. 2 and 6.

The person first sets the angle of tile $\alpha$ of frame 2 to a predetermined value. Upon the latter will depend the intensity of the muscular contractions produced. It may vary from a few degrees in the case of elderly or physically limited persons during their early usage of the device up to 45° or more in the case of athletic persons requiring more strenous exercising. We have found that 30° is a good angle for the average person. In the variation described above wherein a motor drive tilting arrangement is used, this may be varied to suit the person after he has mounted the platform and even while the platform is rotating.

The gravitational pull on the body will increase with increase of angle $\alpha$ and the resistance to the pull will be effected by all the muscles, particularly the skeletal muscles and most particularly those around the waist and abdomen. For this reason the ability to vary angle $\alpha$ forms an important feature of our invention.

After mounting platform 4, the person grasps handles 5 and depresses thumb switch 7 which starts rotation of platform 4.

The speed of rotation of platform 4 also forms an important feature of our invention. It governs the frequency of the exercise forces as distinguished from the intensity which is governed by the angle $\alpha$ as described above.

We have discovered that a speed of rotation of 3 to 10 RPM is very effective and this may be varied by proper arrangement within the control circuit between switch 7 and motor 6, as is known to those skilled in the art. At this range of speed of rotation we produce a muscular contraction of from 1 every 6 seconds to 1 every 20 seconds. We have found further that two exercises of 1 minute duration per day for as short a period as 2 weeks on our machine produces excellent results.

It is thus seen that our device when operated as described herein, closely parallels the optimum discovered by Asa and described above.

We have discovered that when the above described device is used twice a day for a period of 1 minute at 12 hour intervals remarkable results in the matter of weight reduction and muscle building has been noted in a period of as little as 2 weeks.

As opposed to a cyclic contraction-relaxation period in the operation of embodiments 1 or to where muscle group intensity is proportional to the lateral component of gravity, the operator of FIG. 5 overcomes the platform reaction 47 caused by the deflection of spring 44. The operator causes a direct translation of the platform by means of exerting a combined force and moment upon the grips 52. Since the force of gravity is not a basic variable in this exercise, performance of it may be carried in a zero-gravity environment with complete equivalence to the other embodiments described herein. Since the platform is not rotating, the user regulates the exercise cycle by any suitable means as a clock timer. The intensity and extent of the exercise may be visually maintained at all times by use of the indicatoi 54 described above.

The primary difference between the embodiment of FIG. 5*a* and FIG. 5 is that the exercise intensity of FIG. 5*a* has been augmented by a lateral component of gravity due to the inclination of platform 42 to the horizontal. As in the previous exercise, the operator applies the prescribed force and moment to grips 52 which is transmitted through the arms and shoulders and conducted throughout the body where it is finally reacted by the feet upon platform 41. Repetition and cyclical control are supplied by the operator and visual indication of intensity and extent of the exercise is provided by indicator 54 described above.

Although the machines of FIG. 5 and FIG. 5*a* are essentially simpler than the machine of FIG. 6, we have found them to be quite suitable where intensive exercise is not desired or where the exercising is limited to certain particular muscles or areas of the body only.

In the operation of the machine of FIG. 6, of course, we are able to obtain all of the benefits of the previous embodiments, either alone or in combination. Thus when base 62 is lowered to a horizontal position and motor drive 66 is stopped, we may obtain the effects of operation of the machine of FIG. 5. When tilting base 62 is raised to an angle with the motor drive still stopped we get the effects of the operation of the machine of FIG. 5*a*. If now we start the motor drive 66 rotating platform 69 rotates. If at the same time we set the snubber spring tension by means of adjusting screws 36, if the embodiment of FIG. 3 is used, or 46 if the embodiment of FIG. 4 is used, so that support platform 71 cannot move in either of the two horizontal directions, we get the effect of our basic invention shown in the embodiments of FIG. 1 and FIG. 2. If, however, we desire to get the greatest amount of flexibility and exercising effect, we adjust the latter springs to permit platform 71 to move in both horizontal directions while at the same time rotating around with platform 69, we are able to obtain a very thorough and comprehensive exercising effect upon the entire body and one whose overall salutary effect exceeds by far that of any known devices to date.

The force and moment exerted by the user on grip 70 to maintain the position indicator reading 75 in the prescribed manner is transmitted throughout the entire body to where it is eventually reacted by the feet against the platform 71.

By proper programming and use of the automatic regulation which we disclose above, we are ablve to adapt our invention to a wide variety of exercise cycles and hence serve a variety of exercising and muscle conditioning applications.

We claim:

1. A body physical conditioning machine comprising:

an outer hollow frame pivotally mounted on a horizontal axis;

an inner hollow frame rotatably mounted within said outer frame so as to permit rotation about a vertial axis of said inner frame;

a platform mounted on said inner frame;

said platform being adapted to receive a person in a standing position over its vertical centroidal axis;

means independent of the body of said person for rotating said inner frame about its vertical centroidal axis.

2. The machine of claim 1 including means for varying the speed of rotation of said inner frame.

3. The machine of claim 1 including means for automatically varying the angle of said inner frame and said outer frame to the vertical.

4. A body physical conditioning machine comprising:

a platform rotatable about a horizontal adapted to receive a person in a standing position over its vertical centroidal axis;

means for adjusting said platform to various set and predetermined angles to the horizontal;

means independent of the body of said person for rotating said platform at a predetermined speed about said vertical centroidal axis only, while said person is in said standing position.

5. The machine of claim 4 including means for varying the speed of rotation of said platform.

6. The machine of claim 4 including means for varying the angle of said platform to the horizontal.

* * * * *